May 30, 1950 — C. W. DALZELL — 2,509,485
SELECTABLE SCALE ELECTRICAL INSTRUMENT
Filed Dec. 19, 1946 — 2 Sheets-Sheet 1
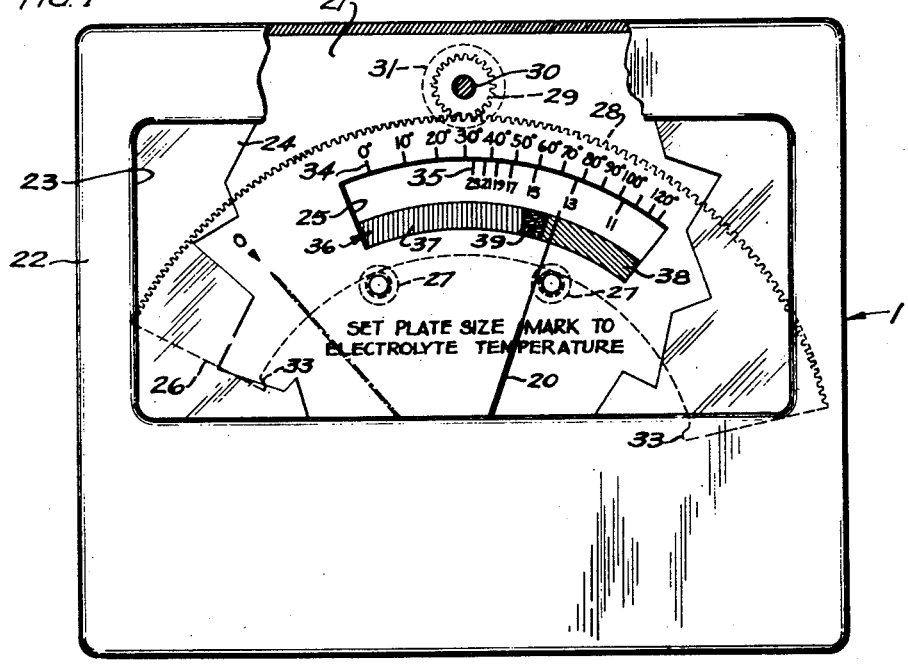
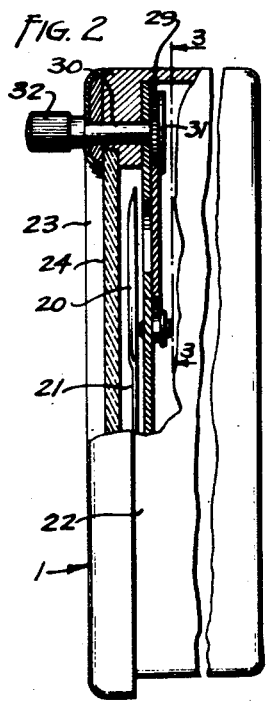
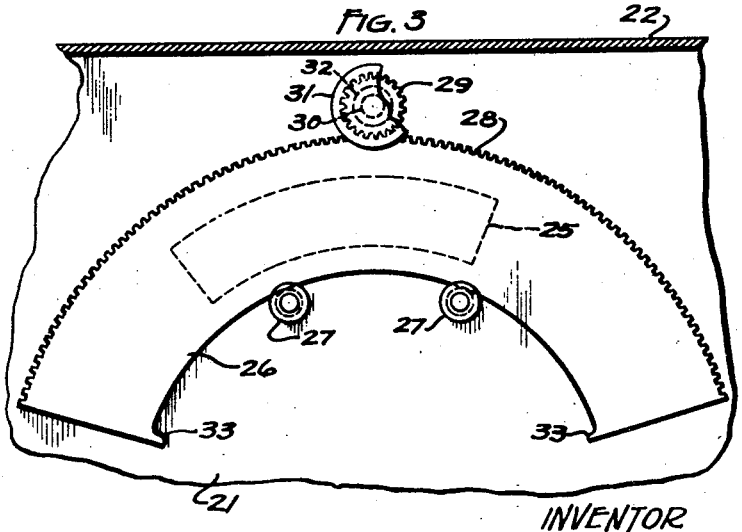
INVENTOR
CLARENCE W. DALZELL
BY
Semmes, Keegin, Robinson and Semmes
ATTORNEYS May 30, 1950      C. W. DALZELL      2,509,485
SELECTABLE SCALE ELECTRICAL INSTRUMENT
Filed Dec. 19, 1946      2 Sheets-Sheet 2
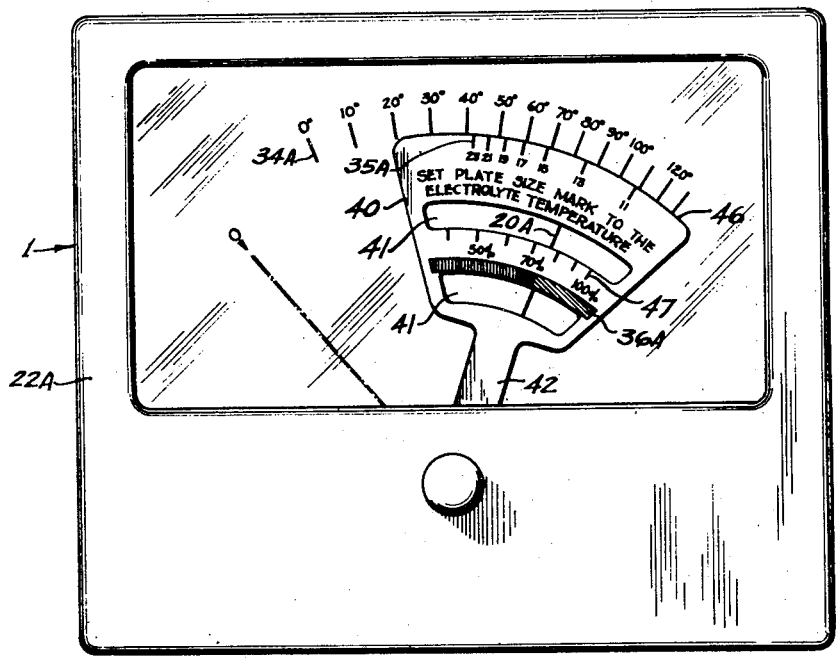
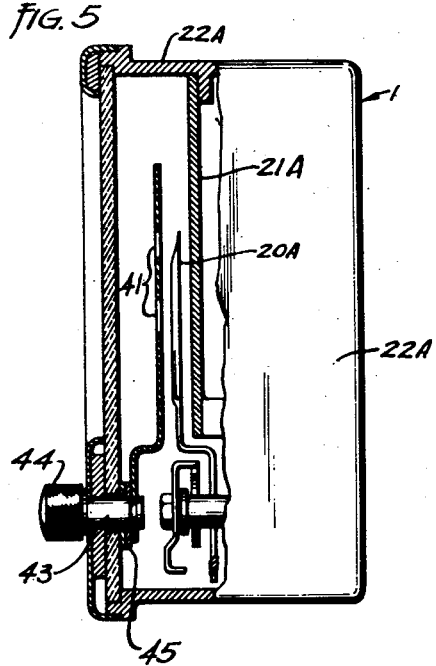
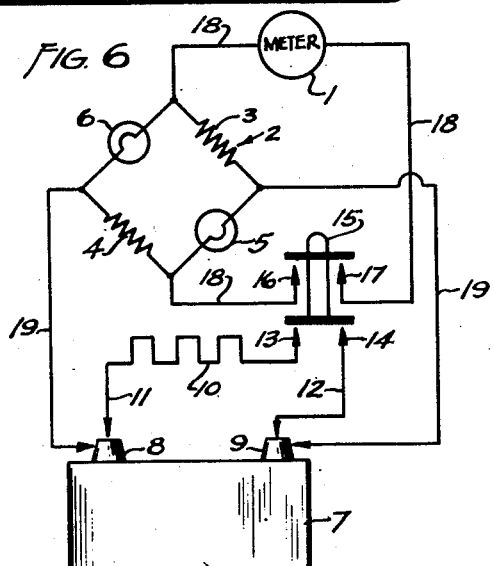
INVENTOR
CLARENCE W. DALZELL
BY
Semmes, Keegin, Robinson and Semmes
ATTORNEYS Patented May 30, 1950

2,509,485

UNITED STATES PATENT OFFICE 2,509,485

SELECTABLE SCALE ELECTRICAL INSTRUMENT

Clarence W. Dalzell, West Caldwell, N. J., assignor to Heyer Industries Incorporated, Belleville, N. J., a corporation of Delaware Application December 19, 1946, Serial No. 717,120

2 Claims. (Cl. 171—95)

This invention relates to electrical testing equipment and more particularly to an electrical meter for indicating directly to an observer the true condition of a specimen where such true condition is dependent upon variable values of characteristics of the specimen.

While the invention herein disclosed is particularly adaptable for indicating the condition or capacity of storage batteries, and will be described in connection with the testing of storage batteries where a true condition of the battery is dependent upon two variable characteristics thereof, namely, the size of the battery (number of plates) and the temperature of the battery electrolyte, it is to be understood that the invention is broader in its aspect, being generally adaptable for giving a direct reading of the value of delivered quantities which are dependent upon variable characteristics of the devices being tested.

Storage batteries are tested for voltage, as an indication of their condition, by discharging the battery through a fixed low resistance at a high rate and measuring the voltage while discharging. The internal resistance of a storage battery diminishes, however, as the number of its plates increases with the effect that a battery having a small number of plates will have a smaller terminal voltage at a high rate discharge than one with a greater number of plates. Similarly a battery whose electrolyte is cold will have a lower terminal voltage at a high rate discharge than one in which the electrolyte is warm. In order therefore, that the terminal voltage of a battery, as indicated by a voltmeter scale, will represent the true condition of the battery, compensating corrections for battery size and electrolyte temperature must be made. It is preferable, to obtain a direct reading of the battery condition, that the compensating correction be made in the condition indicating scale of the meter.

It is therefore one of the objects of the invention to provide an electrical testing instrument for indicating the condition of a specimen where a true indication of the condition is dependent upon variable characteristics of the specimen comprising a meter having manually operable means for compensating the meter indicating scale for the variable characteristics of the specimen to give a direct reading of its true condition.

Another object of the invention is to provide an electrical testing instrument of the above character having a single manually operable means for compensating the condition indicating scale for two variable characteristics of the specimen.

Still another object of the invention is to provide a voltmeter for use in the testing of storage batteries where the true condition of the battery is dependent upon the number of its plates and the temperature of its electrolyte, the meter being provided with a single manually operable adjustment to compensate the condition indicating scale for these two characteristics.

With these and other objects in view the invention consists in the parts and combinations hereinafter set forth with the understanding that various changes may be made therein, such as in the size, shape and arrangement of parts without departing from the spirit of the invention.

In order to make the invention more clearly understood, two embodiments thereof which are similar in principle are shown in the accompanying drawings in which:

Figure 1 is a front elevational view, partly broken away, of a meter constructed in accordance with this invention for testing storage batteries.

Figure 2 is a side elevational view partly broken away and partly in vertical cross section of the meter shown in Figure 1.

Figure 3 is a fragmental vertical sectional view taken on the line 3—3 of Figure 2 looking in the direction of the arrows.

Figure 4 is a front elevational view of a meter of the type shown in Figure 1 but illustrating a modified means for making compensating corrections of its condition indicating scale.

Figure 5 is a side elevational view partly in vertical cross section of the meter as shown in Figure 4.

Figure 6 is a diagrammatic view showing the application of the meter shown in Figures 1 or 2 in testing a storage battery, the meter being shown in a bridge circuit for suppressing the zero and expanding the scale of the meter.

In the testing of storage batteries, the interest is mainly limited to a voltage range of between 5 to 6 volts for a 6 volt storage battery and for this reason it is desirable to use a meter with a suppressed zero and an expanded scale—that is, a meter in which a major portion or even a whole arc of deflection of the needle is within a range of from 5 to 6 volts. A convenient and simple means for obtaining a suppressed zero—expanded scale characteristic in a commercial, linear deflection voltmeter, is illustrated diagrammatically in Figure 6.

As shown in Figure 6, a voltmeter, indicated generally as 1, is connected in a bridge circuit 2 consisting of resistances 3 and 4 which remain constant irrespective of the current flowing through them within the range of operation of the apparatus, and lamps 5 and 6 whose resistance increases with the current passing through them. A meter thus connected and at zero voltage, will have a zero deflection. As the voltage increases from zero to 5, most of the current will flow through the lamps 5 and 6 and the meter will have a negative deflection. At 5 volts the resistances of the lamps 5 and 6 will have increased to such a value that the deflection of the meter needle is again zero, and when the voltage increases above 5 the deflection will be positive. The constants of the bridge circuit 2 are so arranged that the range from 5 to 6 volts gives a full scale positive deflection of the needle by using this second zero point corresponding to 5 volts.

Figure 6 shows the meter 1 and bridge 2 connected to a battery 7 to be tested. The battery 7 has its terminals 8 and 9 connected to a fixed, low load resistance 10 by leads 11 and 12 and contacts 13 and 14 of a switch 15. The switch 15 is preferably of a push button type and is provided with a second set of contacts 16 and 17 through which, and leads 18, the meter may be connected to the bridge circuit.

The bridge circuit of itself as shown in Figure 3 is connected by the wires 19 to the battery posts which means that lamps 5 and 6 are energized immediately upon connecting the leads to the battery. These lamps take only a few moments to reach a stable value of resistance and become fully warmed up. By the time the operator has gotten around to pressing the button 15, the lamps have been stabilized in resistance value and no reverse deflection of the meter will prevail unless the voltage of the battery is extremely low and below the zero voltage value on the meter scale.

To avoid a momentarily initial negative deflection of the meter at the moment the leads are connected to the battery, due to the slow heating of the lamps 5 and 6 and to avoid full scale or beyond full scale readings of the meter which would be brought about by the high open circuit voltage of the battery, switch contacts 16—17 are used. To avoid these confusions, switch contacts 16—17 permit the meter to be connected to the circuit only after load 10 has been connected across the battery. This is effected by arranging the switch 15 so that contacts 16 and 17 close after contacts 13 and 14 have been closed.

The meters shown in both embodiments thereof illustrated in the drawings are of the moving coil or D'Arsonval type in which the deflection of a needle or pointer 20 is a linear function of the milliamperes flowing through the coil. The pointer is pivotally mounted in the meter and is deflected through an arc across the face of a fixed dial 21. The meter mechanism is enclosed in a case 22 provided with a front window 23 in which is fitted a glass 24 spaced forwardly from the dial 21.

In the embodiment of the meter shown in Figures 1, 2, and 3 the dial 21 is provided with an arcuate opening 25 which is preferably concentric with the pivot of the pointer 20. Mounted on the rear face of the dial 21 for movement about the pivotal axis of the pointer and relative to the opening 25 to be viewed therethrough, is a movable dial 26. The dial 26 is arcuate in shape and supported on the fixed dial 21 by means of two or more flanged rollers 27 rotatably mounted on the dial 21 and engaging the smooth bottom arcuate edge of the dial 26. The upper arcuate edge of the dial 26 is provided with gear teeth 28 which mesh with a pinion 29 on the inner end of a short shaft 30 which is journalled for rotation on the upper portion of the case 22. Preferably, a disc 31 is carried by the extreme inner end of the shaft 30 abutting the gear 29 and overlapping the upper edge of the dial element 26 to serve as a holding element and a guide for the movable dial.

The outer end of the shaft 30, which projects through the front face of the meter, is provided with a small knob 32 by means of which the dial 26 may be manually moved, while to limit the movement of the dial 26 opposite ends of its lower edge are provided respectively with hooks 33 adapted to engage the rollers 27 at the extreme positions of movement of the dial.

Marked on the front face of the fixed dial 21 adjacent the upper end of the opening 25 is an arcuate scale 34 which is graduated in values of electrolyte temperature, such as from 0° to 120° F. with the low temperature graduation lying at the left hand end of the scale or nearest the zero position 20a of the pointer 20. On the front face of the dial 26 and adapted to cooperate with the scale 34 in adjusting the movable dial 26, as will be described, is an arcuate scale 35 graduated in values of battery size, the graduations being numbered 23, 21, 19, 17, 15, 13, and 11 which represent the usual plate numbers found in commercial automotive batteries. It will be noted in the scale 35 that the graduation representing the greater number of plates is at the left hand end of the scale nearest the zero position of the pointer.

Also imprinted on the movable dial 26, to be viewed through the opening 25, is an arcuate scale 36 divided into three color zones 37, 38 and 39 which cooperate with the pointer in a deflected position thereof to give an easily seen indication of the battery condition. The color zone 37 on the left hand end of the scale 36 may be colored red to indicate a sub-normal battery voltage requiring recharging or replacing of the battery. The color zone 38 on the right hand end of the scale 36 may be colored green to indicate voltage showing a fully or sufficiently charged battery or one in good condition, while the relatively narrow, intermediate band 39 lying between the bands 37 and 38 may be colored yellow to indicate an intermediate condition between a bad and a good battery. A scale graduated in percentage of rated battery capacity to which the battery is charged, such as shown in Figure 4, may also be employed in conjunction with the scale 36.

The scales 34, 35 and 36 may be laid out from plotted curves or data obtained from tests made under standard conditions. When so laid out and a graduation for a particular battery size on the scale 35 coincides with one for the electrolyte temperature on the scale 34, the scale 36 will occupy a position with respect to the zero position of the pointer 20 so that when the pointer is deflected to the terminal voltage of the battery, it will indicate the true condition of the battery on the scale 36.

The embodiment of meter shown in Figures 4 and 5 is essentially the same as that just described with the exception of the shape of the movable dial and a somewhat simpler means for mounting and adjusting the same. As seen in Figure 4 the movable dial is in the shape of a segmental flag 40 which is mounted in front of the pointer 20A for swinging movement substantially about the pivotal axis thereof. The flag 40 is provided with suitable arcuate cut-outs or openings 41 through which the deflected pointer may be seen. As seen in Figure 5 the lower end or stem 42 of the flag is secured to the inner end of a shaft 43 which is journalled for rotation on the front face of the case 22A coaxially with the pivotal axis of the pointer. The outer end of the shaft 43, which projects through the case, is formed with a finger engaging knob 44. If desired, friction means, such as indicated by the friction washer 45, may be associated with the shaft 43 to inhibit accidental displacement of the flag 40 from its adjusted position.

The front face of the dial 21A is marked with an arcuate scale 34A graduated in degrees of electrolyte temperature like the scale 34 and positioned so that its graduations lie in the path of movement of the upper arcuate edge 46 of the flag 40.

Marked on the flag 40 adjacent the upper arcuate edge thereof is a scale 35A graduated in battery size values similar to the scale 35 and adapted to cooperate with the scale 34A in adjusting the position of the flag 40 as will be described. Below the scale 35A, preferably between the openings 41, is a scale 47 graduated in percentages of rated capacity to which the battery may be charged, while adjacent this scale is a scale 36A which is divided into color zones in the manner of the scale 36. These three color zones, it will be seen, correspond to subranges of the scale 47, that is, the red zone on the left hand end of the scale corresponds to a percentage of capacity to which the battery is charged indicating a poor battery, the green zone on the right hand end of the scale corresponding to a capacity indicating a good battery, and the narrow yellow zone between the red and green indicating a capacity range between good and bad.

In testing a battery, the operator first determines the battery size which is usually designated on the battery case as an 11, 13, 15, etc. plate battery. He then determines the temperature of the electrolyte by inserting a thermometer into the electrolyte through one of the filling caps of the battery. After determining these characteristics of the battery, the operator then adjusts the movable dial by manipulation of the knob 32 in the case of the meter in Figure 1 or the knob 34 in the case of the meter shown in Figure 5, until the graduation representing the noted plate size on the scale 35 coincides with the graduation representing the determined battery temperature on the scale 34. The resistance 10, the bridge circuit 2 and the meter 1 are then placed across the battery terminals as shown in Figure 6 and the switch 15 is closed. The pointer of the meter will then be depressed an amount corresponding to the terminal voltage of the battery which will be indicated as the true condition of the battery on the scale 36.

With the graduation for the larger size battery on the left hand end of the scale 35, it will be noted that the condition indicating scale 36 will be moved lower or further toward the zero position 20a for the smaller size batteries since, as stated above, the smaller battery produces less terminal voltage at a high rate discharge than a larger battery. Thus, a true condition of the smaller battery should be shown on the scale 36 by a smaller pointer deflection than the same condition for a larger battery. Similarly, scale 34 is arranged so that the lower the electrolyte temperature the further counter clockwise, or toward the zero position of the pointer, the condition scale 36 is moved. This likewise, corresponds to the normal operating characteristics of the battery since the colder the electrolyte the less terminal voltage is produced at high rate discharge and the less pointer deflection required to show a given condition.

With the scales 34, 35 and 36 accurately laid out and arranged, when the selected plate size graduation for a particular battery is registered with the selected graduation for its electrolyte temperature, a true indication of the battery condition will be registered by the meter on the scale 36. Thus, it will be seen that the meter with a single adjustment for the two battery variables—plate size and electrolyte temperature—will give a true indication of the battery condition regardless of the values of these variables.

I claim:

1. An electrical instrument for indicating the condition of specimens where a true indication of the condition is dependent upon two variable characteristics of the specimens, a stationary dial having a front and rear face and an opening therethrough, a movable dial carried by the stationary dial on the rear face thereof for movement relative to said opening to be viewed therethrough, a scale on the front face of the stationary dial adjacent the opening graduated in values of one of said characteristics, a scale on the movable dial for cooperation with the first scale and graduated in values of the other characteristic, a pointer movable to a deflected position dependent upon said condition, a condition indicating scale on the movable dial for cooperation with the pointer, and manually operative means for moving the movable dial to bring a selected graduation of the first named scale into coincidence with a selected graduation of the second named scale to thereby correctly position the condition indicating scale with respect to the deflected position of the pointer to give a true indication of said condition.

2. An electrical instrument for indicating the condition of specimens where a true indication of the condition is dependent upon two variable characteristics of the specimen comprising a pointer movable about a pivotal axis to a deflected position dependent upon said condition, a stationary dial having a front face across which the pointer moves and a rear face and an arcuate opening concentric with said axis, an arcuate movable dial abutting the rear face of the stationary dial and covering said opening, means including spaced rollers carried by the stationary dial and engaging the concave arcuate edge of the movable dial for guiding movement thereof in an arc about the pivotal axis of the pointer, a scale on the front face of the stationary dial at an arcuate edge of said opening and graduated in values of one of said variable characteristics, a scale on the movable dial adjacent the first named scale and graduated in values of the other characteristic, a condition indicating scale on the movable dial for cooperation with said pointer, gear teeth on the convex arc of the movable dial, a pinion carried by the stationary dial and meshing with said teeth, a knob connected with the pinion for manually imparting rotation thereto to move said movable dial to bring a selected graduation of the first named scale into coincidence with a selected graduation of the first named scale to thereby position the condition indicating scale with respect to the deflected position of the pointer to give a true indication of said condition.

CLARENCE W. DALZELL.

REFERENCES CITED

The following references are of record in the file of this patent:

UNITED STATES PATENTS

| Number | Name | Date |
| --- | --- | --- |
| 1,056,513 | Dodge | Mar. 18, 1913 |
| 2,164,513 | Gaebel | July 4, 1939 |